(12) United States Patent
Kroeze

(10) Patent No.: US 7,934,756 B2
(45) Date of Patent: May 3, 2011

(54) ADJUSTABLE GRIPPING DEVICE

(75) Inventor: Steven H. Kroeze, Lakewood, CA (US)

(73) Assignee: Kroeze Designs, LLC, Lakewood, CA (US)

( * ) Notice: Subject to any disclaimer, the term of this patent is extended or adjusted under 35 U.S.C. 154(b) by 413 days.

(21) Appl. No.: 12/136,953

(22) Filed: Jun. 11, 2008

(65) Prior Publication Data

US 2009/0309378 A1 Dec. 17, 2009

(51) Int. Cl.
*A47F 13/06* (2006.01)

(52) U.S. Cl. ........................................ 294/19.1; 294/115

(58) Field of Classification Search ................. 294/19.1, 294/115
See application file for complete search history.

(56) References Cited

U.S. PATENT DOCUMENTS

| | | | |
|---|---|---|---|
| 2,346,038 A | 4/1944 | Mason | |
| 2,836,188 A | 5/1958 | Lee | |
| 2,891,811 A | 6/1959 | Strickler | |
| 3,382,608 A * | 5/1968 | Ryan et al. | 446/401 |
| 3,467,116 A | 9/1969 | Ringewaldt | |
| 3,624,948 A * | 12/1971 | Baker, Sr. | 43/26 |
| 3,763,872 A | 10/1973 | Cooley | |
| 3,768,495 A | 10/1973 | Smith | |
| 4,044,784 A | 8/1977 | Smith | |
| 4,085,763 A | 4/1978 | Thomas | |
| 4,299,246 A | 11/1981 | Marsh | |
| 4,615,555 A | 10/1986 | Bateham | |
| 4,711,482 A | 12/1987 | Brown et al. | |
| 4,768,819 A | 9/1988 | Tarlow et al. | |
| 4,811,750 A | 3/1989 | McAllister | |
| 4,827,956 A | 5/1989 | Toot | |
| 5,099,539 A * | 3/1992 | Forester | 15/144.3 |
| 5,176,160 A | 1/1993 | Odborn | |
| 5,392,800 A | 2/1995 | Sergi | |
| 5,433,234 A | 7/1995 | Lapere | |
| 5,577,785 A | 11/1996 | Traber et al. | |
| 5,636,650 A | 6/1997 | Kroeze | |
| 5,640,985 A | 6/1997 | Snyder et al. | |
| 5,823,590 A | 10/1998 | Forrest et al. | |
| 6,257,634 B1 * | 7/2001 | Wei | 294/19.1 |

(Continued)

FOREIGN PATENT DOCUMENTS

JP 2006-218296 8/2006

(Continued)

OTHER PUBLICATIONS

International Search Report from Korean Intellectual Property Office dated Jan. 6, 2010 for corresponding International Application No. PCT/US2009/046629.

(Continued)

*Primary Examiner* — Saúl J Rodríguez
*Assistant Examiner* — Stephen Vu
(74) *Attorney, Agent, or Firm* — Klein, O'Neill & Singh, LLP

(57) ABSTRACT

A gripping assembly having a first or holding end with a pair of rotatable operating elements held therein and connected to a wind assembly having a flexible, non-resilient link held by one end therein for operating a pair of gripping elements. The gripping assembly is movably mounted on a distal end of an adjustable, two part hollow body. The wind assembly is captured between a pair of lever housings and includes a constant force spring to allow the flexible, non-resilient link to be wound onto or from the wind assembly.

12 Claims, 3 Drawing Sheets

U.S. PATENT DOCUMENTS

| | | | |
|---|---|---|---|
| 6,314,647 B1 | 11/2001 | Coxsey | |
| 6,513,844 B1 | 2/2003 | Hsu | |
| 6,520,556 B1 | 2/2003 | Hsu | |
| 6,550,490 B1 | 4/2003 | Morton et al. | |
| 6,739,637 B2 | 5/2004 | Hsu | |
| 6,848,731 B2 | 2/2005 | Khubani et al. | |
| 6,874,833 B2 * | 4/2005 | Keith et al. | 294/19.1 |
| 7,004,520 B2 | 2/2006 | Khubani et al. | |
| 7,038,154 B2 * | 5/2006 | Hofte et al. | 200/332 |
| D545,660 S | 7/2007 | Robinson et al. | |
| 7,243,668 B1 | 7/2007 | Kroeze | |
| 7,344,171 B1 | 3/2008 | McMullan | |
| 2006/0221598 A1 | 10/2006 | March et al. | |
| 2007/0085358 A1 | 4/2007 | Robinson et al. | |
| 2008/0224488 A1 | 9/2008 | Khubani | |

FOREIGN PATENT DOCUMENTS

| | | |
|---|---|---|
| WO | WO2007-021846 | 2/2007 |

OTHER PUBLICATIONS

Written Opinion from Korean Intellectual Property Office dated Jan. 6, 2010 for corresponding International Application No. PCT/US2009/046629.

* cited by examiner

ADJUSTABLE GRIPPING DEVICE

BACKGROUND OF THE INVENTION

1. Field of the Invention

This invention relates generally to gripping devices, and more particularly, to an adjustable gripping device that is easier to assemble, manufacture and use.

2. Description of Related Art

Many types of devices are used by people to extend their reach and to pick up and/or grip items that are not within their reach, or which are not readily available to them for any number of reasons. Many of the available devices, however, are not adjustable or extendable, nor can they be made so. Moreover, the available devices that claim to be adjustable or extendable, tend to be complex, expensive, hard to use and/or not readily available for use by all persons, or actually work as claimed. Therefore, there is a long felt need in the art for an easily used gripping device which is readily available, easy to use and which is relatively inexpensive.

Adjustable canes for picking up dropped items are known, such as those shown in U.S. Pat. Nos. 5,636,650 and 7,243,668, in the name of Steven H. Kroeze, the inventor named herein. Although the canes described in these patents are very handy and useful, they can not be used by all persons to grip and/or pick-up all types of items held in inconvenient places and are not versatile enough to be used in all gripping and earning situations. There, therefore, exists a need in the gripping and carrying art for a relatively inexpensive to manufacture, gripping device usable by a variety of different people, and which is adjustable so that its outer end may be more easily manipulated and operated to allow such persons to grip and/or manipulate a large variety of objects in different positions, that might normally be out of reach or inaccessible.

SUMMARY OF THE INVENTION

Accordingly, it is a general object of the present invention to provide an improved gripping device. It is a particular object of the present invention to provide an improved, substantially low cost gripping device having movable gripping elements at an outer end thereof. It is a still more particular object of the present invention to provide an improved gripping device which is adjustable in length. It is a still more particular object of the present invention to provide an improved adjustable gripping device that enables a user to grip and manipulate distant objects. And, it is a final particular object of the present invention to provide an easily used adjustable gripping device having a rotatable trigger mounted on a holding end to operate a pair of gripping elements mounted at a distal end by means of an operating system held within an extendable body of the device, and which adjustable gripping device is especially low in cost to manufacture.

In accordance with one aspect of the present invention there is provided an improved gripping assembly having an adjustable hollow body with a first or holding end having a rotatable operating element held therein and operatively connected to distal gripping elements, movably mounted on a distal end of the adjustable hollow body.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in conjunction with the accompanying drawings, wherein like reference numerals are used throughout the several views, and, in which:

DESCRIPTION OF THE PREFERRED EMBODIMENTS

Figure 1:
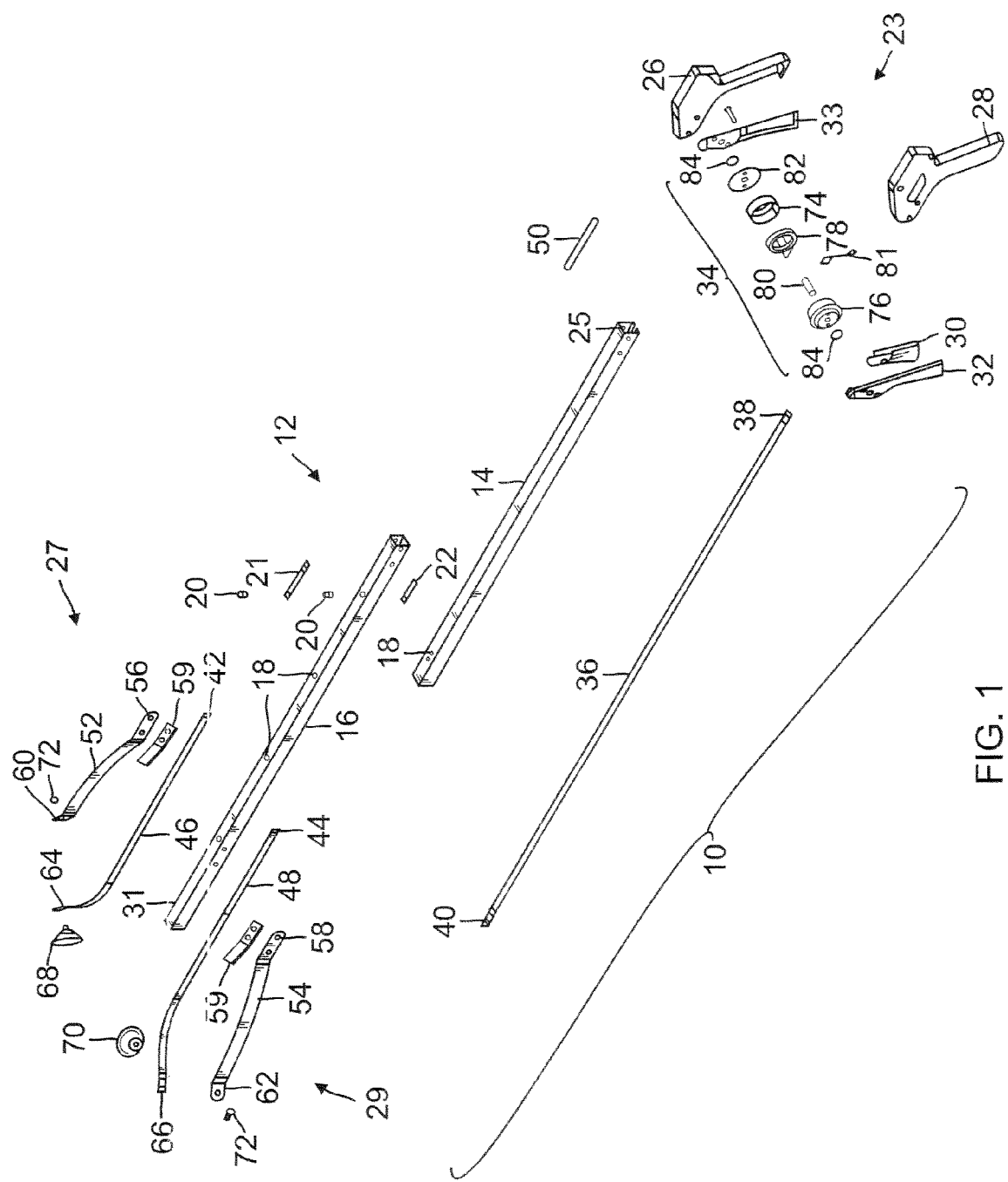
FIG. 1 is an exploded perspective view of the adjustable gripping device of the instant invention.

The following description is provided to enable any person skilled in the art to make and use the invention and sets forth the best modes contemplated by the inventor of carrying out his invention. Various modifications, however, will remain readily apparent to those skilled in the art, since the generic principles of the instant invention have been defined herein specifically to describe an improved, adjustable gripping device assembly, which may be of any desired size, generally indicated at 10.

The gripping assembly 10 generally comprises an elongated hollow body or housing 12, having a first or top body portion or section 14, adjustably, telescopically mounted over or within a second or bottom body portion or section 16. A plurality of openings 18 are provided in the first and second body portions 14, 16 whereby one or more buttons or pins 20, biased by a means, such as spring 21, secured interiorly of either the first or second body portion may be selectively pressed inwardly and the first and second body portions moved with respect to each other so that the one or more buttons 20 move and extend through further aligned openings 18. In this manner the overall length of the gripping device 10 may be easily adjusted to a desired length.

The first body portion 14, and/or the second body portion 16 may also include means, such as a stop or the like, 22, added, formed or secured therein to prevent the first and second body portions from being rotated with respect to each other and/or from being pulled apart when being adjusted.

The first body portion 14 is preferably provided with a handle or holding element 23 held on or secured to an upper or outer end 25 thereof, and the second body portion 16 is preferably provided with at least two movable gripping or holding elements 27, 29 held on or secured to a distal end 31 thereof.

The handle 23 includes a trigger assembly 24, preferably having a plurality of parts, including a winding mechanism, explained more fully below, rotatably mounted within outer housing elements 26, 28. The trigger assembly 24 includes a first or inner finger or trigger portion 30 rotatably mounted within a pair of outer or lever housings 32, 33. The lever housings 32, 33 are also rotatably mounted within the outer housing elements 26, 28.

A wind assembly or mechanism 34 is held in the handle 23 between the outer housing elements 26, 28 and the lever housings 32, 33 of the trigger assembly 24, to allow controlled movement of a non-resilient, but flexible control link or element 36, having a first or inner end 38 wound into and held in the wind assembly 23 in any known or desired manner, and a distal or outer end 40 secured to inner ends 42, 44 of flexible inner legs or portions 46, 48 of the gripping elements 27, 29, which inner legs are partially held in the second body portion 16, to enable actuation of the gripping elements 27, 29, as described more fully below.

Figure 2:
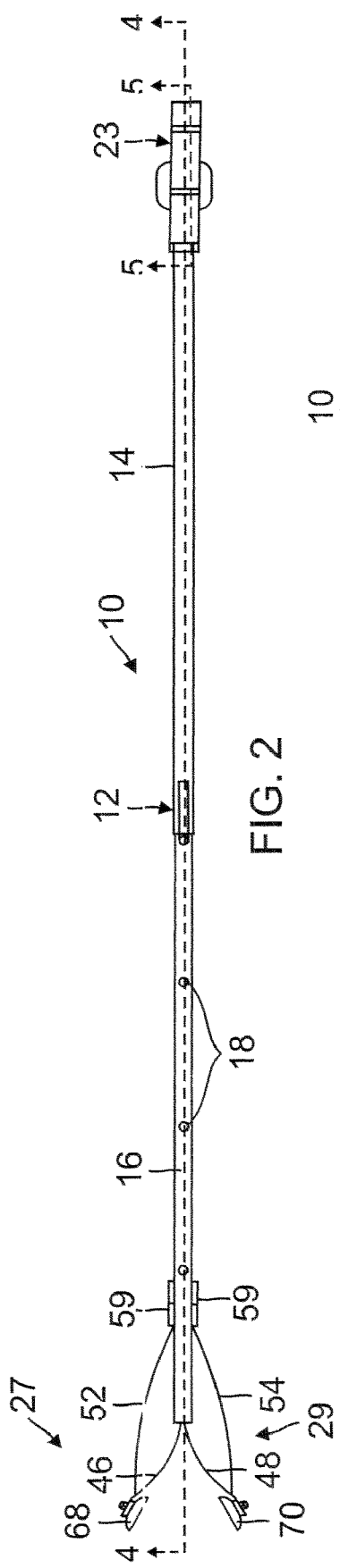
FIG. 2 is a top plan view of an assembled device of the instant invention.
Figure 3:
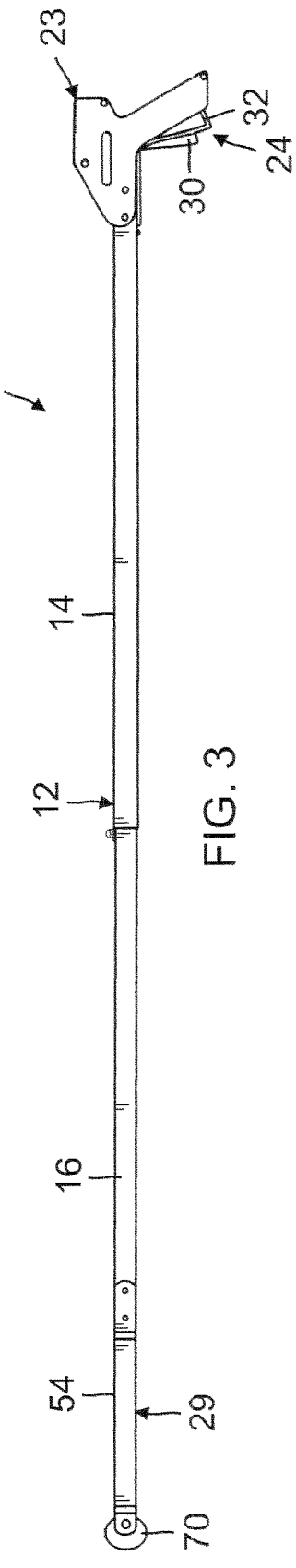
FIG. 3 is a side elevational view of the device shown in FIG. 2.
Figure 4:
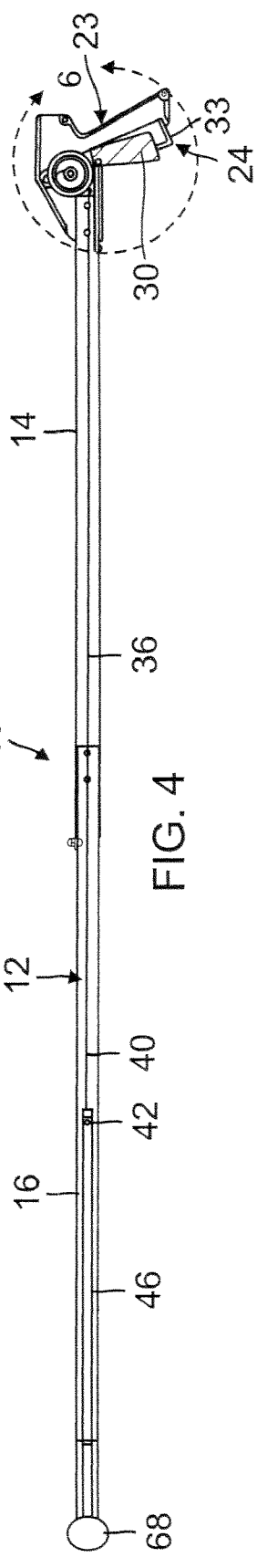
FIG. 4 is a cross sectional view of the device of FIG. 2, taken along line 4-4.

The trigger assembly 24 has a spring 50 connected between an upper end thereof and the top body portion 14 to bias the trigger assembly into the rest position shown in FIG. 2, with the gripping elements 27, 29 held in the open or rest position.

Each of the gripping elements 27, 29 includes an outer flexible, leaf spring-type portion 52, 54 normally biasing the gripping elements into the open position shown in FIG. 2. The outer flexible, leaf spring-type portions 52, 54 have first or inner ends 56, 58 secured to the exterior surface of the lower body portion 16, preferably on opposite side thereof. To ensure that the leaf spring-type portions 52, 54 are sturdy enough to use in all sizes of the device 10, short doubler portions 59 of thicker material, are added to the ends 56, 58, between the ends and the second body portion 16, to which they are secured.

Second or upper ends 60, 62 of the flexible, leaf spring-type portions 52, 54 are secured to outer ends 64, 66 of the flexible inner legs or portions 46, 48 and to holding elements 68, 70, that may take any desired shape, such as bell shaped or suction cups. The first or inner ends 56, 58 are preferably secured to the exterior surface of the lower body portion 16 by pins or rivets, with the doubler portions 59, therebetween. Additionally, the second or upper ends 60, 62 of the flexible, leaf spring-type portions 52, 54 are preferably secured to the outer ends 64, 66 of the flexible inner legs or portions 46, 48 and to the holding elements 68, 70, by means of pins or rivets, such as 72.

As explained previously, the first end 38 of the non-resilient, flexible control element or link 36 is secured in the wind assembly or mechanism 34, for example, by having the first end secured to and then wound around an extending annular portion of a wind gear assembly 76. An inner barrel or core 74 is secured to or in the wind gear assembly 76. Additionally, the wind gear assembly includes a constant force spring 78, an inner wind reel pin 80, a snap or torsion spring 81, and one or more guide plates 82 and washers, or the like 84, assembled together to allow the wind mechanism 34 to selectively roll or wind up, or unroll or release the non-resilient, flexible control element or link 36, as needed, when the adjustable elongated hollow body or housing 12 is either lengthened or shortened. It is to be understood that the non-resilient, flexible control element or link 36 is made from a thin sheet or strip of metal, plastic, reinforced fabric, or the like that will not stretch, but which is flexible and thin enough to be easily wound up by or unrolled by the wind mechanism 34.

Figure 5:
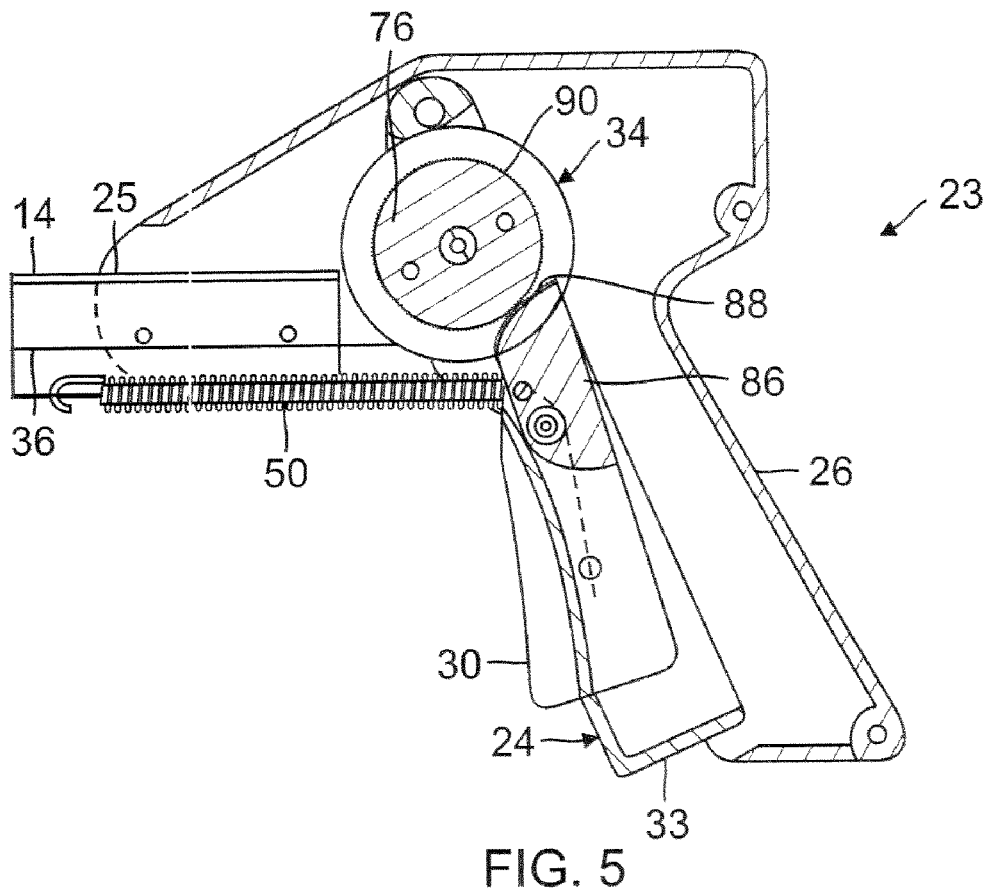
FIG. 5 is enlarged partial cross sectional view of the first or holding end of the device taken along line 5-5 in FIG. 2.
Figure 6:
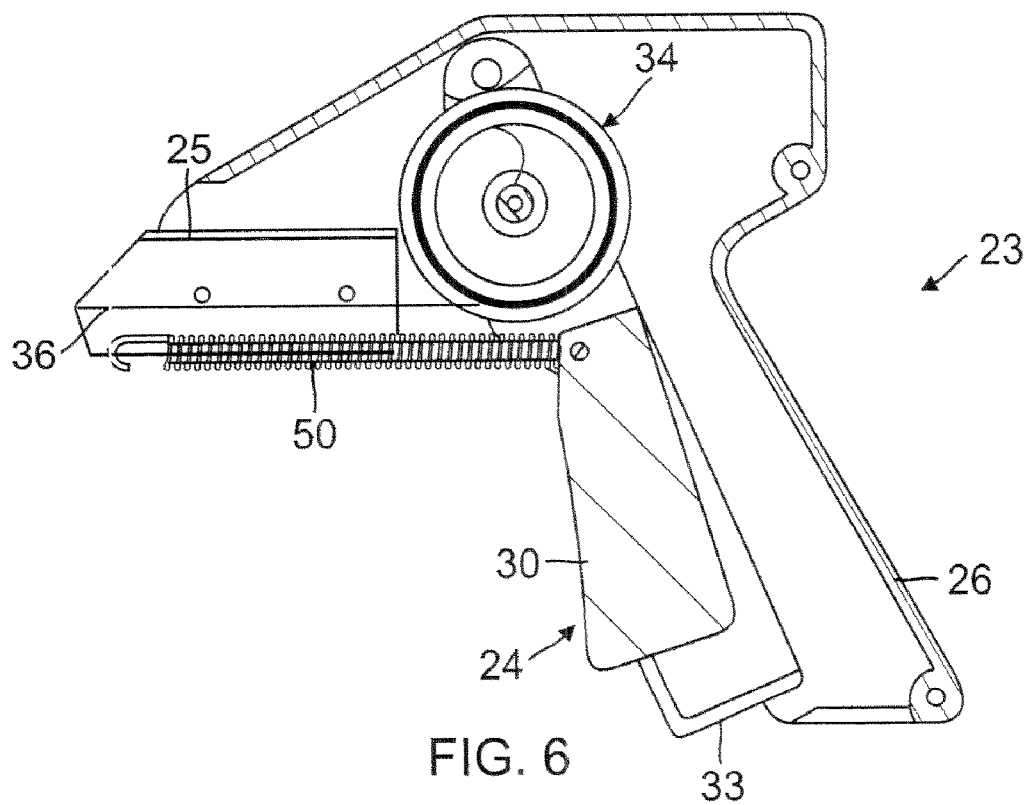
FIG. 6 is an enlarged partial cross sectional view of the first or holding end of the device shown in FIG. 4.

The preferred operation of the gripping device of the instant invention will now be described. The handle end 23 of the device 10 is grasped in one or two hands of a user (depending on the size of the device and handle), not shown. If at the desired length, the trigger 30 is pressed so as to move the trigger inwardly, toward the lever housing (32, 33). As shown in FIG. 5, a contact element 86 secured in the trigger 30 and having gear teeth, a knurled surface or the like 88 on an outer surface thereof moves into contact with similar gear teeth, a knurled surface or the like 90, on the gear portion 76 of the wind assembly to lock the wind assembly against movement. The lever housing (32, 33) is then moved inwardly of the handle 23 so as to move the link 36, thereby pulling the legs 46, 48 inwardly to bring the holding elements 68, 70 together to grasp or hold an item or object held, therebetween. The device releases the item or object when the lever housing and trigger are released and biased into their normal open position.

If, however, the device 10 is not at a desired length, the buttons or pins 20 on the body portions 14, 16 are pressed inwardly and moved relative to each other, either to lengthen or shorten the hollow body 12 and, therefore, the device. If lengthening the device 10, the body portions 14, 16 are pulled apart the desired amount until the buttons or pins 20 align with further desired holes. This movement of the body portions 14, 16 pulls the link 36 out of the wind mechanism, the desired amount. The wind mechanism 34 is allowed to rotate, against the bias of the constant force spring 78, to enable the link 36 to unwind from around the annular portion of the wind gear assembly 76 on which it is wound. Furthermore, if desired to shorten the device 10, with the buttons or pins pressed inwardly, the body portions 14, 16 are pushed together the desired amount until the buttons or pins 20 align with further desired holes. This movement of the body portions 14, 16 also pushes the link 36 into the wind mechanism, the desired amount. The wind mechanism 34 takes up the slack in the link 36 by action, of the constant force spring 78, which winds the slack portion of the link around the annular portion of the wind gear assembly 76.

It, therefore, can be seen that the present invention provides a new and improved telescoping adjustable gripping device that may be of any desired size that may be handled by one or two hands of a user, and that can be manufactured at lower cost because of fewer parts. The device also includes an internal operating means actuable by a trigger assembly that is rotatably mounted in a handle at one end. The handle includes a wind mechanism to allow the gripping device body to be easily extended or shortened. The trigger mechanism is operated to open and close grasping or gripping elements held at a distal end of the device.

Those skilled in the art will appreciate that the above described preferred embodiments are subject to numerous modifications and adaptations without departing from the scope and spirit of the invention. Therefore, it is to be understood that, within the scope of the appended claims the invention may be practiced other than specifically described herein.

What is claimed is:

1. An adjustable gripping device, comprising:
   an elongated hollow body having a first end and a second end comprised of two telescoping members;
   a handle secured to the first end having a movable trigger assembly;
   the second end having a plurality of movably gripping elements rotatably held thereon;
   a flexible, non-resilient control link held in the elongated hollow body and connected between the movable trigger assembly and flexible leg portions of the gripping elements extending into the elongated hollow body; and
   a wind assembly connected between the movable trigger assembly and the flexible, non-resilient control link, a first end of the flexible, non-resilient, control link wound around an extending annular portion of the wind assembly to control operation of the gripping elements when the movable trigger assembly is actuated, and wherein the wind assembly includes a constant force spring to selectively wind up the flexible, non-resilient control link.

2. The adjustable gripping device of claim 1 wherein the movable trigger assembly has a plurality of parts including an inner trigger element rotatably mounted in a slot formed in a lever.

3. The adjustable gripping device of claim 1 wherein the moveable trigger assembly includes a contact element held on an upper end thereof which cooperates with a gear element held in the wind assembly.

4. The adjustable gripping device of claim 1 wherein the telescoping members include an upper body portion and a lower body portion, and the length of the adjustable gripping device is adjusted by telescoping the upper body portion over the lower body portion upon depression of one or more buttons inwardly into the elongated hollow body and allowing the body portions to be moved with respect to each other while allowing the flexible, non-resilient control link to move into or out of the wind assembly.

5. An adjustable gripping device, comprising:
an elongated hollow body having a first end and a second end comprised of two telescoping members;
a handle secured to the first end having a movable trigger assembly;
the second end having a plurality of movably gripping elements rotatably held thereon;
a flexible, non-resilient control link held in the elongated hollow body and connected between the movable trigger assembly and flexible leg portions of the gripping elements extending into the elongated hollow body; and
a wind assembly held in the handle and connected between the movable trigger assembly and the flexible, non-resilient control link to control operation of the gripping elements when the movable trigger assembly is actuated,
wherein the movable trigger assembly has a plurality of parts including an inner trigger element rotatably mounted in a slot formed in a lever, wherein the moveable trigger assembly includes a contact element held on an upper end thereof which cooperates with a gear element held in the wind assembly, and wherein the wind assembly includes a constant force spring to enable the wind assembly to rotate when the two telescoping members are moved with respect to each other to either lengthen or shorten the adjustable gripping device.

6. An adjustable gripping device, comprising:
an elongated hollow body having a first end and a second end comprised of two telescoping members;
a handle secured to the first end having a movable trigger assembly;
the second end having a plurality of movably gripping elements rotatably held thereon;
a flexible, non-resilient control link held in the elongated hollow body and connected between the movable trigger assembly and flexible leg portions of the gripping elements extending into the elongated hollow body; and
a wind assembly connected between the movable trigger assembly and the flexible, non-resilient control link, a first end of the flexible, non-resilient, control link wound around an extending annular portion of the wind assembly to control operation of the gripping elements when the movable trigger assembly is actuated, wherein the movable trigger assembly has a plurality of parts including an inner trigger element rotatably mounted in a slot formed in a lever, and wherein the lever includes a pair of housings capturing the wind assembly therein, and the lever is separately movable with respect to the inner trigger assembly.

7. An adjustable gripping device having a plurality of pickup elements, comprising:
an elongated hollow body having a first end and a second end comprised of two adjustable telescoping members;
a handle secured to the first end and a movable trigger assembly held in the handle;
the second end having a plurality of movably gripping elements rotatably held thereon;
a flexible, non-resilient control link held in the elongated hollow body and connected between the movable trigger assembly and flexible leg portions of the gripping elements extending into the elongated hollow body;
the movable trigger assembly having an inner trigger assembly mounted in a slot formed in a lever;
a wind assembly held in the handle and connected between the movable trigger assembly and the flexible, non-resilient control link to control operation of the gripping elements when the movable trigger assembly is actuated, wherein the inner trigger assembly includes a contact element held on an upper end thereof, the contact element cooperates with a gear element held in the wind assembly, and wherein the wind assembly includes a constant force spring to enable the wind assembly to rotate when the two adjustable telescoping members are either lengthened or shortened.

8. The adjustable gripping device of claim 7 wherein the lever includes a pair of housings capturing the wind assembly therein, and the lever is separately movable with respect to the inner trigger assembly.

9. The adjustable gripping device of claim 7 wherein the adjustable telescoping members include an upper body portion and a lower body portion, and the length of the adjustable gripping device is adjusted by telescoping the upper body portion over the lower body portion upon depression of one or more buttons inwardly into the elongated hollow body and allowing the body portions to be moved with respect to each other while allowing the flexible, non-resilient control link to move into or out of the wind assembly.

10. An adjustable gripping device having a pair of gripping elements, comprising:
an elongated hollow body having a first end and a second end comprised of a first body portion and a second body portion adjustably telescoped together;
a handle secured to the first end and a movable trigger assembly held in the handle;
the second end having the pair of gripping elements rotatably held thereon;
a flexible, non-resilient control link held in the elongated hollow body and connected between the movable trigger assembly and flexible leg portions of the pair of gripping elements; the flexible leg portions having ends which extend into the elongated hollow body and which are attached to a first end of the non-resilient control link;
the movable trigger assembly having an inner trigger assembly mounted in a slot formed in a lever, the inner trigger assembly includes a contact element held on an upper end thereof which cooperates with a gear element held in the wind assembly; and
a wind assembly held in the handle and connected between the movable trigger assembly and a second end of the flexible, non-resilient control link to control operation of the pair of gripping elements when the inner trigger assembly is moved into the lever,
wherein the wind assembly includes a constant force spring to enable the wind assembly to rotate when the first body portion and the second body portion are telescoped with respect to each other to either lengthen or shorten the adjustable gripping device.

11. The adjustable gripping device of claim 10 wherein the lever includes a pair of housings capturing the wind assembly therein, and the lever is separately movable with respect to the inner trigger assembly.

12. The adjustable gripping device of claim 10 wherein the length of the adjustable gripping device is adjusted by telescoping the upper body portion over the lower body portion upon depression of one or more buttons inwardly into the elongated hollow body and allowing the first body portion to be moved with respect to the second body portion while allowing the flexible, non-resilient control link to be wound onto or unwound from the wind assembly.

* * * * *